United States Patent [19]

Meyer

[11] 4,168,249

[45] Sep. 18, 1979

[54] ACRYLIC LACQUER COATING COMPOSITION OF POLYMETHYL METHACRYLATE, COPOLYMERS OF METHYL METHACRYLATE, CELLULOSE ACETATE BUTYRATE AND A POLYESTER PLASTICIZER

[75] Inventor: Walter C. Meyer, Lake Orion, Mich.

[73] Assignee: E. I. Du Pont de Nemours and Company, Wilmington, Del.

[21] Appl. No.: 812,335

[22] Filed: Jul. 1, 1977

[51] Int. Cl.$^2$ ................................................ C08L 1/14
[52] U.S. Cl. .................................... 260/16; 260/17 R; 260/22 CB; 428/480; 428/522; 428/532; 525/375
[58] Field of Search ..................... 260/16, 17 R, 23 P, 260/22 CB

[56] References Cited

U.S. PATENT DOCUMENTS

| | | | |
|---|---|---|---|
| 3,488,307 | 1/1970 | Walus et al. | 260/23 R |
| 3,553,124 | 1/1971 | Donatello et al. | 260/23 P |
| 3,711,433 | 1/1973 | Willey | 260/17 R |

Primary Examiner—Harold D. Anderson

[57] ABSTRACT

A coating composition for finishing the exterior of automobile and truck bodies having a film forming binder of the following constituents:
 (a) polymethyl methacrylate;
 (b) a copolymer of methyl methacrylate and an alkyl amino alkyl methacrylate such as diethyl amino ethyl methacrylate;
 (c) a copolymer of methyl methacrylate and an alkyl acrylate such as butyl acrylate;
 (d) cellulose acetate butyrate;
 (e) a polyester plasticizer
 (f) a polymer of methyl methacrylate, an alkyl acrylate and an α-β ethylenically unsaturated monocarboxylic acid such as acrylic acid or methacrylic acid reacted with an alkylene imine such as propylene imine;
the composition has good adhesion to lacquer and enamel finishes used on automobiles and truck bodies and is excellent for refinishing automobile and truck bodies.

21 Claims, No Drawings

ACRYLIC LACQUER COATING COMPOSITION OF POLYMETHYL METHACRYLATE, COPOLYMERS OF METHYL METHACRYLATE, CELLULOSE ACETATE BUTYRATE AND A POLYESTER PLASTICIZER

BACKGROUND OF THE INVENTION

This invention is related to coating compositions and in particular to acrylic lacquer coating compositions.

To refinish or repair acrylic lacquer and acrylic enamel finishes of automobile and truck bodies, different coating compositions have been utilized for the enamel and for the lacquer finishes. Willey U.S. Pat. No. 3,711,433 issued Jan. 16, 1973 illustrates a typical composition utilized to refinish or repair acrylic lacquer finishes and Walus et al., U.S. Pat. No. 3,488,307 issued Jan. 6, 1970 illustrates a typical composition utilized to refinish or repair acrylic enamel finishes. These aforementioned compositions are excellent refinish compositions. However, to reduce costs and simplify inventories for both suppliers and users which typically are auto body repair shops, a single composition is desired that could be used to refinish or repair both enamel and lacquer finishes.

The novel composition of this invention can be used to refinish or repair enamel and lacquer finishes of automobile and truck bodies and has excellent adhesion to these finishes, good appearance, good durability and weatherability. The composition can also be used as an original equipment finish that is applied by a manufacturer to automobile and truck bodies.

SUMMARY OF THE INVENTION

The coating composition comrises about 5-40% by weight of a film forming binder and about 60-95% by weight of volatile organic solvents; wherein the binder consists essentially of (a) 15-25% by weight, based on the weight of the binder, of polymethyl methacrylate having a relative viscosity of about 1.17-1.20 measured at 25° C. on a 0.5% polymer solids solution using dichloroethylene as the solvent;

(b) 5-15% by weight, based on the weight of the binder, of a copolymer of methyl methacrylate and alkyl amino alkyl methacrylate having 1-4 carbon atoms in the alkyl group and having a relative viscosity of about 1.17-1.20 measured as above;

(c) 20-40% by weight, based on the weight of the binder, of a copolymer of methyl methacrylate and an alkyl acrylate having 2-8 carbon atoms in the alkyl group and having a relative viscosity of 1.17-1.20 measured as above;

(d) 5-25% by weight, based on the weight of the binder, of cellulose acetate butyrate having a viscosity of about 1-20 seconds and a butryl content of about 30-55% by weight;

(e) 15-30% by weight, based on the weight of the binder, of a polyester plasticizer of a saturated fatty oil, a polyol and an organic dicarboxylic acid or an anhydride of an organic dicarboxylic acid having an acid number of about 0.1-10; and (f) 1-10% by weight, based on the weight of the binder, of a polymer of methyl methacrylate, an alkyl acrylate having 2-12 carbon atoms in the alkyl group and an α-β unsaturated monocarboxylic acid and in which the polymer is reacted with an alkylene imine and having a relative viscosity of about 1.17-1.20 measured as above; and wherein the total of (a), (b), (c), (d) (e) and (f) are 100%.

DESCRIPTION OF THE INVENTION

The coating composition has a binder content of film-forming constituents of about 5-40% by weight. The remainder of the constituents in the composition is a solvent blend for the binder. In addition, the composition optionally contains pigment in a pigment to binder ratio of about 1.0/100 to 100/100.

The acrylic polymers utilized in the coating composition are prepared by solution polymerization in which the monomers are blended with a solvent, polymerization catalyst and heated to about 75°-150° C. for 2-6 hours to form a polymer that has a relative viscosity of about 1.17-1.20 measured at 0.5% polymer solids at 25° C. using dichloroethylene as the solvent.

Typical solvents which are used to prepare the acrylic polymers are the following: toluene, ethyl acetate, acetone, ethylene glycol monoethylether acetate, methylethyl ketone, isopropyl alcohol, and other aliphatic, cycloaliphatic and aromatic hydrocarbon, esters, ethers, ketones and alcohols which are conventionally used.

About 0.1-4% by weight, based on the weight of the monomers, of the polymerization catalyst is used to prepare the acrylic polymer. Typical catalysts are: azo-bis-isobutyronitrile, azo-bis(-α-gamma dimethyl) valeronitrile), benzoyl peroxide, t-butyl pivalate and the like.

A chain transfer agent can be used to control the molecular weight of the acrylic polymers. Typical chain transfer agents are 2-mercapto ethanol, dodecyl mercaptan, benzene thioethanol, mercapto succinic acid, butyl mercaptan, mercapto proprionic acid and the like.

The coating composition contains about 15-25% by weight, based on the weight of the binder, of polymethyl methacrylate having the aforementioned relative viscosity. Preferably, about 17-20% by weight, based on the weight of the binder, of polymethyl methacrylate is used in the coating composition.

The coating composition contains about 5-15% by weight, based on the weight of the binder, of a copolymer of methyl methacrylate and an alkyl amino alkyl methacrylate having the aforementioned relative viscosity. Typical alkyl amino alkyl methacrylates are dimethylaminoethyl methacrylate, diethylaminoethyl methacrylate, tertiary butyl aminoethyl methacrylate and the like. Preferably, the copolymer contains about 90-99.5% by weight of methyl methacrylate and 0.5-10% by weight of the alkyl amino alkyl methacrylate such as diethyl amino ethyl methacrylate. One preferred coating composition contains about 8-12% by weight of the above copolymer.

The coating composition contains about 20-40% by weight, based on the weight of the binder, of a copolymer of methyl methacrylate and an alkyl acrylate having 2-8 carbon atoms in the alkyl group and having the aforementioned relative viscosity. The polymer usually contains 80-90% by weight methyl methacrylate and 10-20% by weight butyl acrylate. Other alkyl acrylates that can be used are ethyl acrylate, propyl acrylate, hexyl acrylate, isobutyl acrylate, 2 ethylhexyl acrylate and the like. Preferably, the coating composition contains about 25-35% by weight of the above polymer.

The coating composition contains about 1–10% by weight, based on the weight of the binder, of a polymer of methyl methacrylate, an alkyl acrylate having 2–12 carbon atoms in the alkyl group and an $\alpha,\beta$ unsaturated monocarboxylic acid in which the polymer is reacted with an alkylene imine. Any of the aforementioned alkyl acrylates can be used to prepare the polymer including nonyl acrylate, decyl acrylate and lauryl acrylate. Preferably, ethyl acrylate, butyl acrylate, or 2 ethyl hexyl acrylate is used. Typically useful acids used to prepare this polymer are acrylic acid and methacrylic acid. Alkylene imines such as propylene imine or ethylene imine or hydroxy ethyl ethylene imine are reacted with the carboxyl groups of the acid of the polymer. Generally, about 90–100% of the carboxyl groups are reacted with an alkylene imine. About 2–5% by weight, based on the weight of the binder, of one particularly useful polymer can be used in the composition in which the polymer is of 70–90% by weight of methyl methacrylate, 9–20% by weight of ethyl acrylate and 1–10% by weight of methacrylic acid which is reacted with propylene imine.

About 5–25% by weight, based on the weight of the binder, of cellulose acetate butyrate (CAB) is used in the coating composition. The CAB has a butyryl content of about 30–55% by weight and a viscosity of about 1–20 seconds measured according to ASTMD 1343-56 A a blend of a high viscosity CAB and a low viscosity CAB can be used in the composition in a weight ratio of about 1:1 to 1:6. The high viscosity CAB has a butyryl content of about 35–40% by weight and a viscosity of 15–20 seconds and the low viscosity CAB has the same butyryl content and a viscosity of about 1–3 seconds. In one preferred composition of 3–15% of the low viscosity CAB is used in combination with about 3–10% by weight of the high viscosity CAB.

The composition contains about 15–30% by weight, based on the weight of the binder, of a polyester plasticizer of a saturated fatty oil, a polyol and an organic dicarboxylic acid or an anhydride thereof having an acid number of about 0.1–10. The polyester is prepared by conventional polymerization techniques in which the constituents and a conventional esterification catalyst such as lead tallate, sodium naphthenate, barium oxide, barium hydroxide, lithium hydroxide are reacted at 80°–200° C. for about 0.5–6 hours. A typical saturated fatty oil that can be used to prepare the polyester is coconut oil. Polyesters of a polyol and an organic dicarboxylic acid or anhydride thereof without a saturated fatty oil can also be used.

Typical polyols that can be used to prepare the polyester are ethylene glycol, propylene glycol, dipropylene glycol, butane diol, diethylene glycol, neopentyl glycol and the like. Other polyols that can be used are glycerol, trimethylol propane, trimethylol ethane, pentaerythritol, dipentaerythritol, sorbitol and the like.

Typical organic dicarboxylic acids or anhydrides that can be used to prepare the polyester are adipic acid, azelaic acid, chlorendic acid, chlorendic anhydride, phthalic acid, phthalic anhydride, terephthalic acid, isophthalic acid, succinic acid, succinic anhydride trimelletic acid, trimelletic anhydride and the like.

One particularly useful polyester used in the coating composition is of coconut oil, ethylene glycol and phthalic anhydride. About 20–25% by weight, based on the weight of the binder, of the alkyd resin is used in the composition.

Another aspect of this invention is a coating composition comprising 5–40% by weight of a film-forming binder and 95–60% by weight of a volatile organic solvent; wherein the binder consists essentially of about (a) 30–50% by weight, based on the weight of the binder, of polymethyl methacrylate having a relative viscosity of about 1.17 to 1.20 measured at 25° C. on a 0.5% polymer solids solution using a dichloroethylene solvent;

(b) 20–40% by weight, based on the weight of the binder, of cellulose acetate butyrate having a viscosity of about 1–3 seconds and a butyryl content of 30–55% by weight;

(c) 5–15% by weight, based on the weight of the binder, of a phthalate ester plasticizer;

(d) 10–30% by weight, based on the weight of the binder, of a polyester plasticizer of a saturated fatty oil, a polyol and an organic dicarboxylic acid or an anhydride of a dicarboxylic acid and having an acid number of about 0.1–10; and (e) 1–10% by weight, based on the weight of the binder, of a polymer of methyl methacrylate, an alkyl acrylate having 2–12 carbon atoms in the alkyl group and an $\alpha,\beta$-unsaturated monocarboxylic acid and in which the polymer is reacted with an alkylene imine and having a relative viscosity of about 1.17 to 1.20 measured as above;

wherein the total of (a), (b), (c), (d) and (e) are 100%.

The aforementioned polymethyl methacrylate, cellulose acetate butyrate and high and low viscosity blends thereof or cellulose acetate butyrate having a 1–3 second viscosity and a butyryl content of 35–40% by weight, the polyester and the acrylic resin reacted with an alkylene imine can be used the above coating composition. Preferred phthalate ester plasticizers are butyl cyclohexyl phthalate and butyl benzyl phthalate.

As mentioned before, the composition can contain pigments. These pigments can be introduced into the composition by first forming a mill base with any of the above polymers utilized in the coating composition or with other compatible polymers by conventional techniques, such as sand-grinding, ball milling, attritor grinding, or two roll milling to disperse the pigments. The mill base is blended with the film-forming constituents as shown in the following Examples.

Any of the conventional pigments used in the coating compositions can be utilized in this composition. Examples of typical pigments that can be used are as follows: metallic oxide, such as titanium dioxide, zinc oxide, iron oxide and the like, metal hydroxide, metal flakes such as aluminum flake, sulfide, sulfates, carbonates, carbon black, silica, talc, china clay, phthalocyanine blues and greens, organo reds, organo maroons and other organic dyes.

The coating composition of this invention can be applied over a variety of substrates, such as metal, primed metal, metal coated with enamels or lacquers, wood, glass, plastics, and the like, by any of the conventional application methods, such as spraying, electrostatic spraying, dipping, brushing, flow-coating and the like. The viscosity of the composition can be adjusted for any of these methods by adding solvents as necessary.

The applied coatings can be dried at ambient temperatures or baked at relatively low temperatures of about 35°–100° C. for about 15 minutes-2 hours. The resulting finish is about 0.1–5 mils thick but for most uses, a 1–3 mil thick finish is used. The resulting finish has good appearance and can be rubbed or polished with conventional techniques to improve the smoothness or gloss or both. The finish has good adhesion to substrates of all types particularly industrial lacquers or enamel finished substrates. The finish is hard and resistant to weathering, staining, scratches and the like. These characteristics make the composition particularly useful for finishing or refinishing automobile and truck bodies. The coating composition can also be used on aircraft, farm equipment such as tractors, appliances, vending machines, bridges, water tanks, gas tanks and the like.

The following Examples illustrate the invention. All quantities are shown on a weight basis unless otherwise indicated

EXAMPLE 1

An iminated acrylic polymer solution prepared by charging the following constituents into a reaction vessel equipped with a thermometer, a stirrer, a reflux condenser and a heating mantel;

|  | Parts by Weight |
|---|---|
| Portion 1 | |
| Toluene | 54.79 |
| Isopropanol | 110.83 |
| Ethyl Acetate | 148.05 |
| Methyl methacrylate monomer | 254.08 |
| Ethyl acrylate monomer | 45.80 |
| Methacrylic acid monomer | 13.80 |
| Azobisisobutyronitrile | 0.73 |
| Portion 2 | |
| Azobisisobutyronitrile | 0.83 |
| Ethyl acetate | 6.70 |
| Toluene | 4.80 |
| Portion 3 | |
| Azobisiobutyronitrile | 1.26 |
| Ethyl acetate | 7.32 |
| Toluene | 13.60 |
| Portion 4 | |
| Isopropanol | 19.86 |
| Toluene | 104.55 |
| Portion 5 | |
| Propylene imine | 9.20 |
| Isopropanol | 13.80 |
| Total | 810.00 |

Portion 1 is premixed and then is charged into the reaction vessel with constant mixing and heated until the temperature of the resulting reaction mixture rises to a reflux temperature of about 82°–84° C. and is maintained at this temperature by slightly refluxing the mixture for about 60 minutes. Portion 2 is premixed and added to the reaction vessel and the resulting reaction mixture is held at about 81°–83° C. by slightly refluxing the mixture for about 90 minutes. Portion 3 is premixed and added to the reaction vessel and the resulting reaction mixture is held at about 81°–83° C. at a slight reflux for about 45 minutes. Portion 4 is added with mixing and then Portion 5 is premixed and added and the reaction mixture is thoroughly mixed for about 15 minutes and held at about 76°–80° C. for about 2 hours or until the acid number of the reaction mixture reaches about 0.1–3.5 and then cooled to room temperature.

The resulting polymer solution has a solids content of about 39% by weight, a Gardner Holdt Viscosity measured at 25° C. of about W-Y and the polymer has the following composition: methyl methacrylate/ethyl acrylate/methacrylic acid/propylenimine in a weight ratio of 81.0/14.6/4.4/2.9 in which all of the propyleneimine has reacted with the methacrylic acid. The polymer has a relative viscosity of about 1.2 measured on a 0.5% polymer solids solution using a dichloroethylene solvent at 25° C.

A butyl acrylate/methyl methacrylate polymer solution is prepared by charging the following constituents into a reaction vessel equipped as above:

|  | Parts by Weight |
|---|---|
| Portion 1 | |
| Acetone | 81.61 |
| Toluene | 82.00 |
| Butyl acrylate monomer | 58.72 |
| Methyl methacrylate monomer | 267.61 |
| Benzoyl peroxide | 1.61 |
| Portion 2 | |
| Benzoyl peroxide | 0.72 |
| Toluene | 6.72 |
| Portion 3 | |
| Toluene | 317.12 |
| Total | 816.11 |

Portion 1 is charged into the reaction vessel and heated to about 100° C. and held at this temperature for about 1 hour and 20 minutes. Portion 2 is premixed and added to the reaction vessel and the resulting reaction mixture is held at about 100° C. for about 20 minutes and then Portion 3 is added.

The resulting polymer solution has a solids content of about 40% by weight and Gardner Holdt Viscosity measured at 25° C. of V½ to W. The polymer contains about 82% methyl methacrylate and 18% butyl acrylate and has a relative viscosity measured as above of about 1.19.

A methyl methacrylate/diethyl amino ethyl methacrylate copolymer solution is prepared by charging the following constituents into a reaction vessel equipped as above:

|  | Parts by Weight |
|---|---|
| Portion 1 | |
| Methyl methacrylate monomer | 322.15 |
| Diethylaminoethyl methacrylate monomer | 3.25 |
| Acetone | 115.40 |
| Toluene | 48.80 |
| Azobisisobutyronitrile | 1.09 |
| Portion 2 | |
| Acetone | 5.00 |
| Azobisisobutyronitrile | 0.55 |
| Portion 3 | |
| Acetone | 27.65 |
| Toluene | 293.10 |
| Total | 816.99 |

Portion 1 is changed into a reaction vessel equipped as above and heated to about 100° C. and held at this temperature for about 1 hour. Portion 2 is added and the resulting reaction mixture is held at 100° C. for another hour. Portion 3 is added and the reaction mixture is cooled.

The resulting polymer solution has a polymer solids content of about 40% by weight and a Gardner Holdt Viscosity measured at 25° C. of about X-Z₂. The polymer is 99% by weight methyl methacrylate and 1% diethyl amino ethyl methacrylate and has a relative viscosity measured as above of about 1.2.

A methyl methacrylate polymer solution is prepared by charging the following constituents into a reaction vessel equipped as above:

|  | Parts by Weight |
|---|---|
| Portion 1 | |
| Methyl methacrylate monomer | 322.28 |
| Acetone | 112.71 |
| Toluene | 48.33 |
| Benzoyl peroxide | 2.18 |
| Portion 2 | |
| Acetone | 32.29 |
| Toluene | 290.29 |
| | 808.08 |

Portion 1 is premixed and charged into a reaction vessel and heated to about 100° C. and held at this temperature for about 1½ hours and then Portion 2 is added and the resulting polymer solution is cooled to room temperature.

The polymer solution has a polymer solids content of about 40% by weight and the polymer has a relative viscosity of about 1.19 measured as above.

A coconut oil/ethylene glycol/phthalic anhydride ester resin solution is prepared by charging the following constituents in a reaction vessel equipped as above:

|  | Parts by weight |
|---|---|
| Portion 1 | |
| Coconut oil | 275.70 |
| Ethylene glycol | 185.00 |
| Dibutyltin oxide | 0.26 |
| Lead tallate | 0.23 |
| Portion 2 | |
| Phthalic Anhydride | 394.70 |
| Portion 3 | |
| Toluene | 63.74 |
| Portion 4 | |
| Toluene | 75.36 |
| Total | 994.99 |

Portion 1 is charged into the reaction vessel and heated to 188° C. and held at this temperature for about 1 hour. Portion 2 is then added and then the temperature of the resulting reaction mixture is brought to 150° C. Portion 3 is added and the reaction mixture is held at its reflux temperature of about 190° C. for about 30 minutes and then the temperature of the reaction mixture is increased to about 200° C. and held at this temperature for 30 minutes. The reaction mixture is heated to 232° C. and held for 2 hours at this temperature and then heated to 245° C. and held until the acid number of the reaction mixture is below about 10 which usually takes about 1 hour. The reaction mixture is heated to 250° C. and held at this temperature for about 2 hours. During the above reaction, water is removed from the reaction mixture. Portion 4 is added and the resulting ester resin solution is cooled to room temperature.

The ester resin solution has a solids content of about 85% by weight and a Gardner Holdt Viscosity measured at 25° C. of about Y-$Z_1$ and the ester resin has an acid number of about 7-10.

A white mill base is prepared by charging the following constituents into a mixing vessel and then grinding the mixture in a sand mill:

|  | Parts by weight |
|---|---|
| Portion 1 | |
| Methyl methacrylate/diethylamino ethyl methacrylate copolymer solution (prepared above) | 7.00 |
| Cellulose acetate butyrate(CAB) solution (25% CAB having a 38% butyryl content and a 1 second viscosity ina solvent of 5 parts toluene/2 parts acetone) | 6.00 |
| Toluene | 18.05 |
| Ethylene glycol monoethyl ether acetate | 10.00 |
| Portion 2 | |
| Titanium dioxide pigment | 55.00 |
| Portion 3 | |
| Ester resin solution (prepared above) | 3.95 |
| Total | 100.00 |

Portion 1 is mixed for 15 minutes and then portion 2 is added and mixed for 1 hour and portion 3 is added and mixed for 1 hour. The resulting mixture is ground in a sandmill.

An aluminum flake mill base is prepared by mixing the following constituents.

|  | Parts by Weight |
|---|---|
| Portion 1 | |
| Methyl methacrylate polymer solution (prepared above) | 56.64 |
| Aluminum Paste (67% aluminum flake in an aliphatic hydrocarbon.) | 12.12 |
| Portion 2 | |
| Methyl methacrylate polymer solution (prepared above) | 21.35 |
| Toluene | 11.89 |
| Total | 100.00 |

Portion 1 is added to a mixer and slowly mixed for 3 hours and then portion 2 is added and mixed for 1 hour.

A white acrylic lacquer coating composition is prepared as follows:

|  | Parts by Weight |
|---|---|
| Portion 1 | |
| Acetone | 12.97 |
| Ethylene glycol monoethyl ethyl acetate | 25.28 |
| Toluene | 33.18 |
| Ester resin solution (prepared above) | 56.48 |
| Portion 2 | |
| Silicone solution (1% solids silicone SF69 in xylene) | 0.25 |
| Methyl methacrylate polymer solution (prepared above) | 107.32 |
| Methyl methacrylate/diethyl aminoethyl methacrylate copolymer solution (prepared above) | 45.69 |
| Butyl acrylate/methylmethacrylate copolymer solution (prepared above) | 148.75 |
| Iminated acrylic polymer solution (prepared above) | 17.50 |
| Cellulose Acetate Butyrate solution (described above) | 101.88 |
| High Molecular Weight Cellulose Acetate Butyrate (CAB) solution (15% | 124.45 |

-continued

| | Parts by Weight |
|---|---|
| solids CAB having a 38% butyryl content and a 20 second viscosity measured according to ASTMD-1343-56 at 25° C. in a solvent blend of 60 parts acetone/25 parts toluene.) | |
| Portion 3 | |
| White Mill base (prepared above) | 168.47 |
| Total | 842.22 |

The constituents of Portion 1 are added in the order shown and mixed until uniform. Portion 2 is added and thoroughly mixed before Portion 3 is added and mixed until uniform.

The resulting lacquer has a pigment to binder ratio of 40/100. The binder is of 18.5 parts parts polymethyl methacrylate, 10.0 parts methyl methacrylate/diethylamino ethyl methacrylate copolymer, 25.5 parts butyl acrylate/methyl methacrylate copolymer, 23.0 parts of ester resin, 12.0 parts CAB having a 1 second viscosity, 8.0 parts CAB having a 20 second viscosity and 3.0 parts of an iminated acrylic polymer.

A white acrylic lacquer B is prepared identical to the above lacquer A except the iminated acrylic polymer is omitted and the butyl acrylate/methyl methacrylate copolymer is substituted therefore.

A silver metallic acrylic lacquer C is prepared by mixing together the following constituents.

| | Parts by Weight |
|---|---|
| Portion 1 | |
| Acetone | 22.11 |
| Ethylene glycol monoethyl ether acetate | 39.21 |
| Toluene | 51.60 |
| Ester resin solution (prepared above) | 59.09 |
| Portion 2 | |
| Silicone solution (1% solids silicone SF69 in xylene) | 0.24 |
| 4-dodecyloxy-2-hydroxy benzophenne (DOBP U.V. Screening agent) | 6.96 |
| Methyl methacrylate polymer solution (prepared above) | 18.40 |
| Methyl methacrylate/diethyl aminoethyl methacrylate copolymer solution (prepared above) | 62.16 |
| Butyl acrylate/methyl methacrylate copolymer solution (prepared above) | 158.39 |
| Iminated acrylic polymer solution (prepared above) | 18.63 |
| Cellulose Acetate Butyrate solution (described above) | 169.08 |
| High Molecular Weight Cellulose Acetate Butyrate (CAB) solution (15% solids CAB having a 38% butyryl content and a 20 second viscosity measured according to ASTMD-1343-56 at 25° C. in a solvent blend of 60 parts acetone/25 parts toluene). | 49.73 |
| Portion 3 | |
| Aluminum flake mill base (prepared above) | 124.40 |
| Total | 780.00 |

The constituents of Portion 1 are added to a mixer in the order shown with constant mixing and Portion 2 is added and thoroughly mixed and then Portion 3 is added and thoroughly mixed.

The resulting lacquer has a pigment to binder ratio of 4.07/100. The binder is of 18.5 parts polymethyl methacrylate, 10.0 parts methyl methacrylate/diethylamino ethyl methacrylate copolymer, 25.5 parts butyl acrylate/methyl methacrylate copolymer, 20.2 parts of ester resin, 2.8 parts DOBP, 17.0 parts CAB having a 1 second viscosity, 3.0 parts CAB having a 20 second viscosity and 3.0 parts of an iminated acrylic polymer.

A silver metallic acrylic lacquer D is prepared identical to the above lacquer C except the iminated acrylic polymer is omitted and the butyl acrylate/methylmethacrylate copolymer is substituted therefore.

The above prepared lacquers A,B,C and D are each sprayed onto separated primed steel panels coated with baked acrylic enamels and baked for 24 hours at 43° C. to provide a topcoat about 2 mils thick.

The adhesion of the topcoat to the substrate is determined on a set of these panels by scribing a rectangular grid through the topcoat to the metal with a knife and placing scotch tape over the grid and then removing the tape. A subjective rating of 10 means that none of the topcoat is removed while a rating of 0 indicates that all of the topcoat is removed. The panels are tested for initial adhesion, wet adhesion after 96 hrs. exposure to 100% relative humidity at 38° C. and recovered adhesion, i.e., the panel subjected to the wet adhesion test is allowed to dry at room temperature for 24 hours and then tested as above.

Several sets of panels were subjected to outdoor weathering in Florida for a 3 month period and then tested for adhesion as above. The results of these tests are summarized in the following table:

Table

| | | Initial Adhesion* | | Wet Adhesion* | | Recovered Adhesion* | |
|---|---|---|---|---|---|---|---|
| | | Start | 3mo. Fla. | Start | 3mo. Fla. | Start | 3mo. Fla. |
| Lacquers | A+C | 7.4 | 7.8 | 1.9 | 2.2 | 6.3 | 4.6 |
| | B+D | 2.0 | 2.9 | 0.5 | 0 | 1.7 | 0.9 |

*(average of 16 data points)

The above results show that Lacquers A and C which contain only a small percentage of an iminated acrylic polymer have substantially better adhesion under all conditions that do Lacquers B and D which do not contain an iminated acrylic polymer.

EXAMPLE 2

The following constituents are blended together to form a clear lacquer that will dry at room temperatures:

| | Parts by Weight |
|---|---|
| Isopropanol | 386.0 |
| Acetone | 464.0 |
| Toluene | 156.0 |
| Xylene | 276.0 |
| Cellulose Acetate Butyrate (having a butyryl content of 38% and a viscosity of 2 seconds measured as in Example 1) | 220.3 |
| Ethylene glycol monoethyl ether acetate | 232.0 |
| DOBP U.V. Screening agent (described in Example 1) | 25.7 |
| Silicone solution (described in Example 1) | 7.8 |
| Butyl cyclohexyl phthalate | 73.3 |
| Ester resin solution (prepared | 197.0 |

| | Parts by Weight |
|---|---|
| in Example 1) | |
| Iminated Acrylic Polymer solution (prepared in Example 1) | 94.4 |
| Methyl methacrylate Polymer solution (prepared in Example 1) | 850.0 |
| Total | 2982.5 |

The above lacquer is sprayed onto primed steel panels coated with an acrylic lacquer and primed steel panels coated with an acrylic enamel and in each case dried at 43° C. for 24 hours. The adhesion of the lacquer on each of the substrates is checked as in Example 1 and in each case the lacquer has an acceptable level of adhesion to the panel, i.e., an adhesion level of 7 and above when dry.

I claim:

1. A coating composition consisting essentially of 5–40% by weight of a film forming binder and 60–95% by weight of volatile organic solvents; wherein the binder consists essentially of about
   (a) 15–25% by weight, based on the weight of the binder, of polymethyl methacrylate having a relative viscosity of about 1.17 to 1.20 measured at 25° C. on a 0.5% polymer solids solution using dichloroethylene solvent;
   (b) 5–15% by weight, based on the weight of the binder, of a copolymer of units of methyl methacrylate and alkyl amino alkyl methacrylate having 1–4 carbon atoms in the alkyl groups and having a relative viscosity of about 1.17 to 1.20 measured as above;
   (c) 20–40% by weight, based on the weight of the binder, of a copolymer of units of methyl methacrylate and an alkyl acrylate having 2–8 carbon atoms in the alkyl group and having a relative viscosity of about 1.17 to 1.20 measured as above;
   (d) 5–25% by weight, based on the weight of the binder, of cellulose acetate butyrate having a viscosity of about 1–20 seconds and a butyryl content of 30–55% by weight;
   (e) 15–30% by weight, based on the weight of the binder, of a polyester plasticizer consisting essentially of the reaction product of a saturated fatty oil, a polyol and an organic dicarboxylic acid or an anhydride of an orginic dicarboxylic acid and having an acid number of about 0.1–10; and
   (f) 1–10% by weight, based on the weight of the binder, of a polymer of units of methyl methacrylate, an alkyl acrylate having 2–12 carbon atoms in the alkyl group and an α,β-unsaturated monocarboxylic acid and in which the polymer is reacted with an propylene imine and having a relative viscosity of about 1.17–1.20 measured as above;
wherein the total of (a), (b), (c), (d), (e) and (f) are 100%

2. The coating composition of claim 1 containing pigment in a pigment to binder weight ratio of about 1/100 to about 100/100.

3. The coating composition of claim 1 in which the methyl methacrylate and alkyl amino alkyl methacrylate copolymer consists essentially of units of methyl methacrylate and units of diethyl amino ethyl methacrylate.

4. The coating composition of claim 3 in which the copolymer consists essentially of about 90–99.5% by weight of units of methyl methacrylate and 0.5–10% by weight of units of diethyl amino ethyl methacrylate.

5. The coating composition of claim 1 in which the copolymer of methyl methacrylate and an alkyl acrylate consists essentially of units of methyl methacrylate and units of butyl acrylate.

6. The coating composition of claim 5 in which the copolymer consists essentially of about 80–90% by weight of units of methyl methacrylate and 10–20% by weight of units of butyl acrylate.

7. The coating composition of claim 1 in which the cellulose acetate butyrate is a mixture of a high viscosity cellulose acetate butyrate and a low viscosity cellulose acetate butyrate.

8. The coating composition of claim 7 in which the high viscosity cellulose acetate butyrate has a butyryl content of about 35–40% by weight and a viscosity of about 15–20 seconds and in which the low viscosity cellulose acetate butyrate has a butyryl content of 35–40% by weight and a viscosity of 1–3 seconds and in which the weight ratio of the high viscosity to low viscosity cellulose acetate butyrate is about 1:1 to about 1:6.

9. The coating composition of claim 1 in which the polyester plasticizer consists essentially of the reaction product of coconut oil, ethylene glycol and phthalic anhydride.

10. The coating composition of claim 1 in which the methyl methacrylate, alkyl acrylate, α,β-unsaturated monocarboxylic polymer reacted with an alkylene imine consists essentially of units of methyl methacrylate, units of ethyl acrylate, units of methacrylic acid and the alkylene imine is propylene imine.

11. The coating composition of claim 10 in which the polymer consists essentially of about 70–90% by weight of units of methyl methacrylate, 9–20% by weight of units of ethyl acrylate and 1–10% by weight of units of methacrylic acid which are reacted with propylene imine.

12. The coating composition of claim 2 in which the binder consists essentially of
   (a) polymethyl methacrylate
   (b) a copolymer consisting essentially of about 90–99.5% by weight of units of methyl methacrylate and 0.5–10% by weight of units of diethyl amino ethyl methacrylate;
   (c) a copolymer consisting essentially of 80–90% by weight of units of methyl methacrylate and 10–20% by weight of units of butyl acrylate;
   (d) a mixture of a high viscosity cellulose acetate butyrate having a butyryl content of about 35–40% by weight and a viscosity of about 15–20 seconds and a low viscosity cellulose acetate butyrate having a butyryl content of 35–40% by weight and a viscosity of about 1–3 seconds in which the ratio of the high to low viscosity cellulose acetate butyrate is about 1:1 to about 1:6;
   (e) a polyester plasticizer consisting essentially of the reaction product of coconut oil, ethylene glycol and phthalic anhydride; and
   (f) a polymer consisting essentially of about 70–90% by weight of units of methyl methacrylate, 9–20% by weight of units of ethyl acrylate and 1–10% by weight of units of methacrylic acid which are reacted with propylene imine.

13. A coating composition consisting essentially of 5–40% by weight of a film forming binder and 60–95% by weight of volatile organic solvents; wherein the binder consists essentially of about (a) 30–50% by weight, based on the weight of the binder, of polymethyl methacrylate having a relative viscosty of about 1.17–1.20 measured at 25° C. on a 0.5% polymer solids solution using dichloroethylene solvent;

(b) 20–40% by weight, based on the weight of the binder, of cellulose acetate butyrate having a viscosity of about 1–3 seconds and a butyryl content of 30–55% by weight;

(c) 5–15% by weight, based on the weight of the binder, of a phthalate ester plasticizer;

(d) 10–30% by weight, based on the weight of the binder, of a polyester plasticizer consisting essentially of the reaction product of a saturated fatty oil, a polyol and an organic carboxylic acid or an anhydride of an organic dicarboxylic acid and having an acid number of about 0.1–10; and (e) 1–10% by weight, based on the weight of the binder, of a polymer of units of methyl methacrylate, an alkyl acrylate having 2–12 carbon atoms in the alkyl group and an $\alpha,\beta$-unsaturated monocarboxylic acid and in which the polymer is reacted with an propylene imine and having a relative viscosity of about 1.17 to 1.20 measured as above;

wherein the total of (a), (b), (c), (d) and (e) are 100%.

14. The coating composition of claim 13 containing pigment in a pigment to binder weight ratio of about 1/100 to about 100/100.

15. The coating composition of claim 13 in which the methyl methacrylate and alkyl amino alkyl methacrylate copolymer consists essentially of units of methyl methacrylate and units of diethyl amino ethyl methacrylate.

16. The coating composition of claim 15 in which the copolymer consists essentially of about 90–99.5% by weight of, units of methyl methacrylate and 0.5–10% by weight of units of diethyl amino ethyl methacrylate.

17. The coating composition of claim 13 in which the phthalate plasticizer is butyl cyclohexyl phthalate or butyl benzyl phthalate.

18. The coating composition of claim 13 in which the polyester plasticizer consists essentially of the reaction product of coconut oil, ethylene glycol and phthalic anhydride.

19. The coating composition of claim 13 in which the methyl methacrylate, alkyl acrylate, $\alpha,\beta$-unsaturated monocarboxylic polymer reacted with an alkylene imine consists essentially of units of methyl methacrylate, ethyl acrylate, methacrylic acid and the alkylene imine is propylene imine.

20. The coating composition of claim 13 in which the polymer consists essentially of about 70–90% by weight of units of methyl methacrylate, 9–20% by weight of units of ethyl acrylate and 1–10% by weight of units of methacrylic acid which are reacted with propylene imine.

21. The coating composition of claim 13 in which the binder consists essentially of (a) polymethyl methacrylate;

(b) cellulose acetate butyrate having a viscosity of about 1–3 seconds and a butyryl content of about 35–40% by weight;

(c) a phthalate plasticizer of butyl cyclohexyl phthalate;

(d) a polyester plasticizer consisting essentially of the reaction product of coconut oil, ethylene glycol and phthalic anhydride; and (e) a polymer consisting essentially of about 70–90% by weight of units of methyl methacrylate, 9–20% by weight of units of ethyl acrylate and 1–10% by weight of units of methacrylic acid which are reacted with propylene imine.

* * * * *